Oct. 20, 1964

R. ORSINI 3,153,481

PLASTIC ARTICLES

Original Filed Sept. 17, 1957

INVENTOR
RENÉ ORSINI
BY
Robert W. Kell
ATTORNEY

Oct. 20, 1964 R. ORSINI 3,153,481
PLASTIC ARTICLES
Original Filed Sept. 17, 1957 7 Sheets-Sheet 3

INVENTOR
RENÉ ORSINI
BY
Robert W. Kell
ATTORNEY

Oct. 20, 1964   R. ORSINI   3,153,481
PLASTIC ARTICLES
Original Filed Sept. 17, 1957   7 Sheets-Sheet 5

INVENTOR
RENE ORSINI
BY Robert W. Kell
ATTORNEY

Oct. 20, 1964

R. ORSINI

3,153,481

PLASTIC ARTICLES

Original Filed Sept. 17, 1957

INVENTOR
RENE ORSINI
BY
ATTORNEY

Oct. 20, 1964 R. ORSINI 3,153,481
FLASTIC ARTICLES
Original Filed Sept. 17, 1957 7 Sheets-Sheet 7

INVENTOR
RENE ORSINI
BY
ATTORNEY 3,153,481
PLASTIC ARTICLES
René Orsini, Casablanca, Morocco, assignor, by mesne assignments, to Ethicon, Inc., Sommerville, N.J., a corporation of New Jersey
Original application Sept. 17, 1957, Ser. No. 684,440. Divided and this application Jan. 31, 1962, Ser. No. 170,202
Claims priority, application France, Sept. 17, 1956, 722,082, Patent 1,158,577
9 Claims. (Cl. 206—59)

The present invention relates to the manufacture of articles of thermoplastic material from extruded casings or superposed films. In the manufacture of those articles which are obtained through transverse welded seams effected on the casing or the films joined longitudinally, with subsequent cutting into sections opposite to or in the immediate neighborhood of the seams, numerous difficulties are met with, especially in the manufacture of articles which are of small width and not very thick.

The term "article," for purposes of illustrating the invention, may include a bag of appropriate shape.

The first difficulty is encountered when it is attempted to increase the speed of operation of the machines: the latter is limited by electrostatic phenomena which become all the more troublesome the lighter the material, by the time taken in the welding operation, but above all by the fact that the moment of welding the fused material does not offer any mechanical resistance, which may cause stretching of the seams until breakage occurs if its it attempted to make the plastic material move forward by a pull exerted beyond the welding place. On the other hand, the casings show a considerable amount of stretching with irregularities in thickness which makes this stretching uncertain and necessitates a precise adjustment before printing and before cutting into sections. The cutting operation even becomes practically impossible when bags of complex shape are concerned.

It has already been proposed to wedge the plastic material between an endless belt of polytetrafluoroethylene (Teflon) and a cylindrical support so that the area gripped tightly extends on both sides of the seam line, the thermoweld being effected across the band of Teflon. This process necessitates a well-known cooling of the seam to be made on the wedged area, which is practically unattainable for very great rates. Indeed, the Teflon does not show any adhesion with the usual plastic materials, which makes it used to protect the heating welding jaws.

The object of the invention is a process and means allowing all the disadvantages mentioned above to be remedied, and allowing bags of all shapes to be obtained, cut up if desired, which stay in one piece with respect to the seams, during the whole time of manufacture of the bags, whether printed or not, and possibly up to and including the filling, with a support allowing their handling.

According to the process which is the object of the invention, the casing or casings or the films of thermoplastic material are applied to at least one support, the nature of which allows an adhesion at least temporary and/or partial between the thermoplastic material and the support as a result of a thermoweld effected through the whole, and the seams for the purpose of forming the bag are made.

By this process, a complex unit is obtained constituted by the bags welded at the seams integral with the support, which allows the plastic material to be carried along by mechanical forces exerted on the support without taking into account the possible fragility of the plastic material at the moment of welding and without fear of any stretching or deformation.

In addition, it is to be understood that the support gives a greater rigidity to the material and keeps the seams in conformity, which allows only a single adjustment to be required for all the bags of a transverse group, both for the simultaneous printing of all these bags and for the cutting.

Moreover, the presence of the support makes possible the simultaneous cutting at the seam, the bags possibly remaining attached among themselves by the support.

In carrying out the process it is possible to start from narrow casings fed in parallel and having the width of the finished bag, on which only transverse thermowelds are made, or from a casing of great width on which are made both longitudinal and transverse seams or shaped seams. This single casing can further be replaced by two superposed films or a single film suitably folded.

The support may be of paper, linen or any other material having a similar surface condition, selected according to whether a temporary or permanent joining together is required. Paper will preferably be chosen as the support when the support is cut with the bag. In this last case, the support is likewise cut lengthwise between the parallel casings and left as a packing between the bags, which is of interest for the stacking and the subsequent handling of the said bags, especially when they are made from thin casings. When the support is detached before cutting, an endless band is preferably used.

In some applications, a support can be placed on both sides of the plastic material, one of these supports only being able to be applied during one part of the process of manufacture.

Instead of being applied to all the surface of the bag, the support can be restricted to joining strips between casings arranged longitudinally, or to strips placed opposite the seams which demarcate the bags longitudinally and/or transversely.

The support may be permanently incorporated in the bag and in order to obtain a permanent joint, it may then preferably be made of a material showing a good weldability with the casing, such as, for example, a complex comprising a support coated with the material constituting the casing. Bags may thus be obtained in which the whole surface or only the seams are reinforced by the support or supports used during the operation of the process.

When it is desired to cut out the seamed bag at the same time as the welding operation, a set of welding jaws or electrodes is used, one at least of which has a rib projecting with respect to its end supporting surface, a rib which has the effect of driving the melted thermoplastic material along its line of impression. The presence of the support or supports allows this operation to be effected without contraction or deformation of the welded bag.

The welding jaw having the rib can be the unheated jaw or counter-electrode which, in this case, consists essentially of a flexible supporting surface, of silicone rubber or the like, corresponding to the outline of the seam and giving to the latter a width sufficient to assure for it a mechanical resistance, and of a metallic part flush with the said surface following the outline of the cut-out of the bag.

The weld is effected in this case with the support placed against the heating electrode. The metallic part of the counter-electrode sinks into the softened thermoplastic casing up to the support and effects the cutting out.

The welding jaw with the rib may be the heating jaw or electrode, the rib or cutter being slightly projecting with respect to the end surface of the latter; the welding is carried out with the support placed between the cutter and the heating electrode, on the one hand, and the thermoplastic films to be welded, on the other hand, the counter-electrode being made of pliable or semi-hard material.

The rib projecting with respect to the electrode or jaw may, in both cases, be continuous over the whole length of the latter or discontinuous, possibly having projecting points which cause a perforation of the support.

The projection of the cutter with respect to the end face of the electrode or jaw is preferably adjustable on the one hand, to allow the adjustment as a function of the thickness of the thermoplastic material to be joined, and on the other hand, to allow on occasion only the start of the cutting between bags by a groove which leaves the bags joined together.

The process which is the object of the invention also permits bags to be manufactured starting from a film folded in a V on one or both its edges, and to be cut or the cutting out between the bags to be started without coming up against the difficulties encountered in the absence of the support. The bags thus obtained are then rolled up on a mandrel with their opening on one of the edges of the roller, which facilitates taking up again with a view to filling.

The present invention has also as its object machines for welding and electrodes or welding jaws for operating the process and the characteristic features of which will follow from the description of various examples made hereafter with reference to the attached drawings, in which:

FIGURE 6 is a diagrammatic longitudinal section of a machine operating continuously, with transverse electrodes set on a rotative frame, the spacing of the said electrodes being adjustable.

The frame of the machine in FIGURES 1 to 4 is represented diagrammatically by a table 1, on which are assembled the various equipment for welding, printing and cutting. It is quite evident that these arrangements correspond, in practice, to a plurality of machines in juxtaposition selected from known types or formed specially for operating the process.

Figure 1:
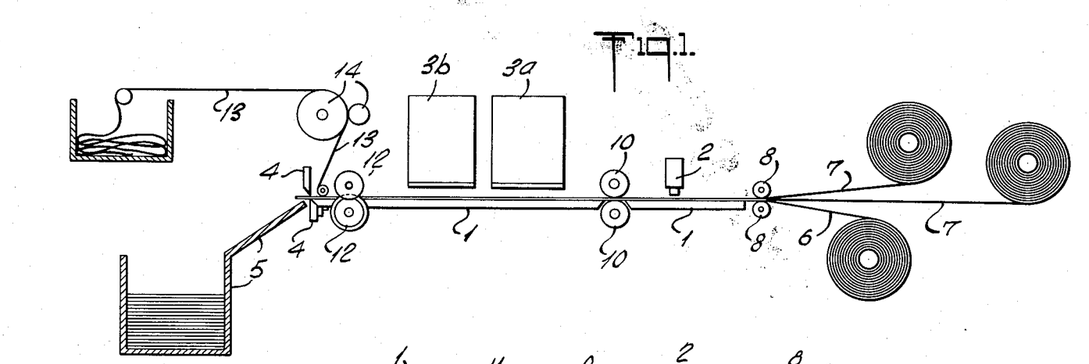
FIGURE 1 is a diagrammatic elevation of a machine for the manufacture of bags printed and cut from narrow casings.
Figure 2:
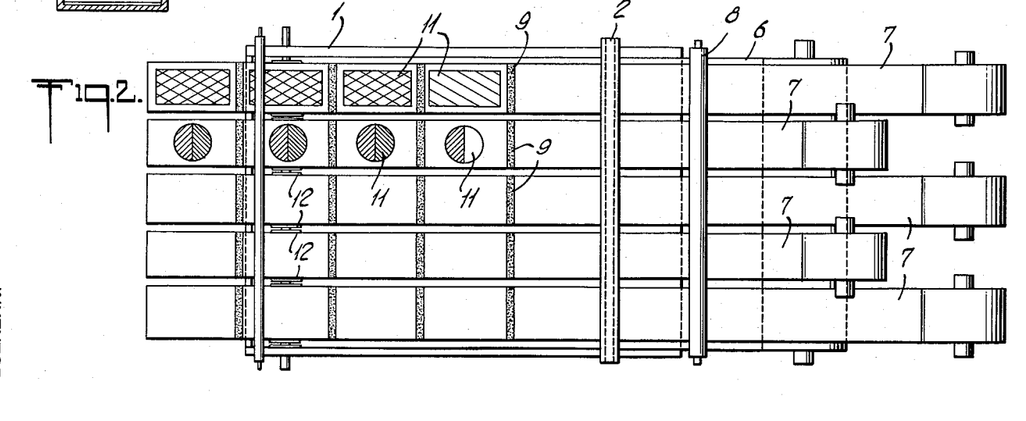
FIGURE 2 is a diagrammatic plan view of the machine in FIGURE 1.

The machine of FIGURES 1 and 2 comprises a transverse welding arrangement 2, two printing devices 3a and 3b for providing a bicolored print, and a transverse cutting arrangement 4, with devices 5 for the reception and stacking of the finished bags. These arrangements are known and the printing devices and cutting devices are as usual each combined with a photoelectric cell (not shown) ensuring the setting of the transverse welding lines made in the plastic material by the equipment 2.

The machine according to the invention is fed by a paper strip 6, for example of tissue paper, whose width corresponds to the transverse capacity of the machine, and by casings of plastic material 7 which may have all the same width or be of different widths if bags of different types are required.

The casings 7 are placed parallel side by side and slightly spaced from one another on the strip 6 opposite to the rollers 8, which cooperate in their entrainment, and they arrive under the welding arrangement 2, which makes transverse seams 9 whose lengthwise spacing corresponds to the length of the bags to be made. These welds are produced only opposite the casings but cause the casings 7 and the strip of paper 6 to stick together.

There is thus produced a complex which shows a firm connection between its elements which is sufficient to enable the printing and cutting of all the bags present on one transversal to take place simultaneously without longitudinal displacement of the same between neighboring bags.

The cylinders 10 carry the sheet thus made up towards the subsequent equipment in the manufacture. The print 11 can be produced in several colors under the respective devices 3a and 3b. It then remains to cut the bags transversely, which is carried out by the shears 4. Immediately before this cutting operation, the strip 6 is cut lengthwise between the bags by means of the cutting wheels 12. These cutting wheels are shown on the drawing as separating a strip of paper 13 between rows of bags, strips 13 which are entrained by the cylinders 14 and which ensure the maintenance of the tension opposite to the shears 4. Arrangements for entrainment which are not shown can also be placed beyond the cutting arrangement 4, arrangements which take the plastic bag with its superposed part of paper strip and deposit it in the stacking cases 5.

In the embodiment of FIGURES 3 and 4, there are again found certain elements of the machine of FIGURES 1 and 2, but the machine is fed with a single casing 15 of great width. This casing 15 is placed on the strip 6 opposite the cylinders 8, but the upper cylinder serves for the pulley for an endless belt 16, made of silicone glass fibers, for example, which is thus superposed on the casing and the paper strip. The transverse seams 17 are thus produced through this band 16 which like the paper strip 6 is found adhering to the casing 15.

Figure 3:
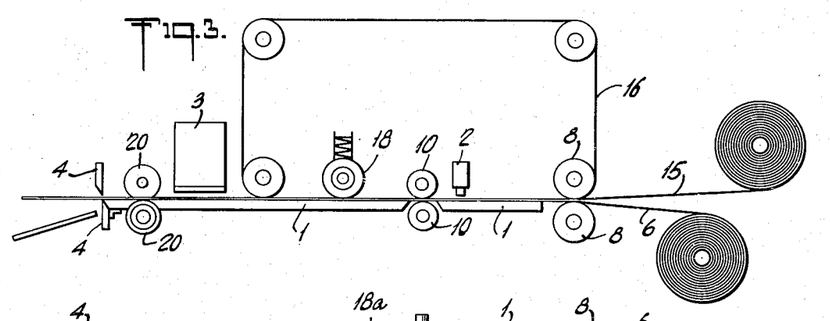
FIGURE 3 is a diagrammatic elevation of a machine for the manufacture of bags printed and cut from a broad casing.
Figure 4:
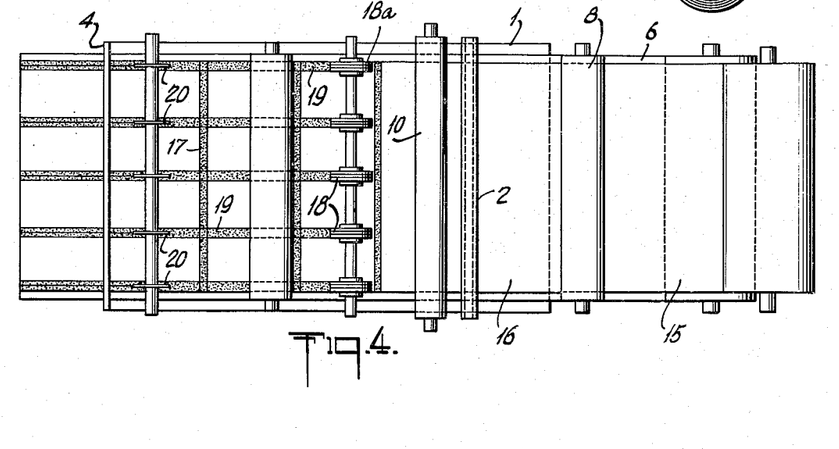
FIGURE 4 is a diagrammatic plan view of the machine in FIGURE 3.

Heated cutting wheels 18 in addition produce, through the band 16, longitudinal seams 19 so as to demarcate by these seams bags aligned longitudinally and transversely. Cutting wheels 18a also weld preferably along the edges of the casing in order to ensure that all the end bags are identical. Further, they allow two films to be used instead of one casing. The band 16 is then detached from the casing 15. Prints can then be applied to the latter by means of a printing arrangement represented diagrammatically by 3, before the longitudinal cutting up of the rows of bags, provided on one side with a sheet of paper, in the center of the seams 10 by means of the cutting wheels 20, and before the transverse cutting up of the bags and the band 6 by means of the shears 4.

Figure 5:
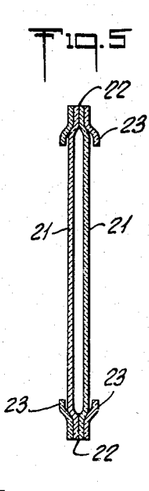
FIGURE 5 is a transverse section in a bag in which the support is only applied, and permanently, at the seams.

On FIGURE 5, there is shown in section a bag produced by the longitudinal and transverse welds. The bag comprises two surfaces 21 joined at their edges by the seams 22. The process has been carried out by limiting the support to narrow strips placed opposite the welds on the two sides of the plastic casing. These strips are preferably made of complex material, for example, of paper or cellulosic film coated with polyethylene. It follows that at the seam, these strips are welded together with the polyethylene composing the bag and are then cut with the bag, giving half-strips 23 which strengthen the seams. These half-strips can be more or less wide, of any color and may be pinked.

The machine shown in FIGURE 6 is fed by a thermoplastic casing from a roller 24 and a sheet support, for example of paper, from a roller 25.

It comprises a framework represented diagrammatically by two side plates 26 united by a table 27. The arrangement intended to produce the transverse seams is carried by a spindle 28 rotatably mounted between the side plates 26. It comprises two opposed circular plates 29 including radial slots 30. In the corresponding slots of the two opposed plates 29 are mounted and fastened the ends of the welding electrodes 31. The slots being equidistant in their angular spacing, the electrodes, if they have the same radial position, are equidistant, and it is possible to modify these equal spacings by modification of their radial position.

Outside the electrodes passes an endless belt 32, made, for example, of silicone glass cloth or any other material which can be used in between the heated electrodes and the material to be welded. This belt is stretched by a cylinder 33 rotatably mounted between the plates 26, and the position of which is adjustable in order to balance the peripheral variations due to the different radial positions of the electrodes.

Two cylinders 34 and 35 are supported flexibly on the upper and lower sections of the belt 32 so as to ensure a constant tension of the latter.

The casing 24 and the support 25 pass under the cylinder 34 between the latter and the belt 32, the thermoplastic casing being laid against the latter. The welds effected through the belt 32 opposite each electrode unite the casing 24 and the sheet support 25 and the latter are detached after passage on the cylinder 35 and come on the table 27, where cutting wheels 36 produce parallel lengthwise seams.

The bags formed by the two series of welds are cut out by the cutting wheels 37, which cut at the longitudinal seams, and the shears 38, which cut lengthways.

Figure 7:
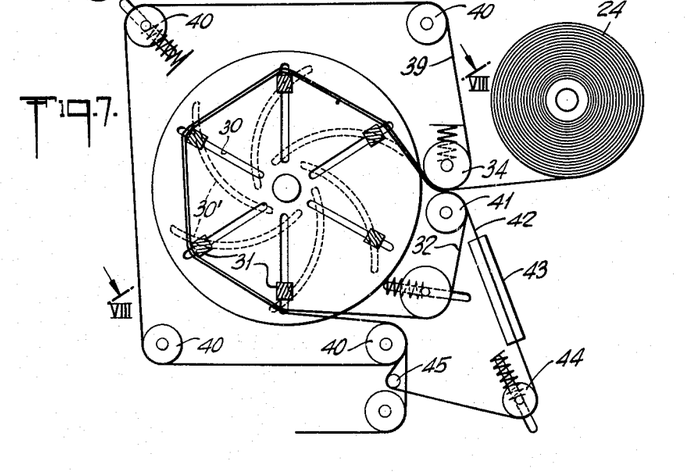
FIGURE 7 is a view corresponding to FIGURE 6 for a second method of construction of the machine of the latter figure.
Figure 8:
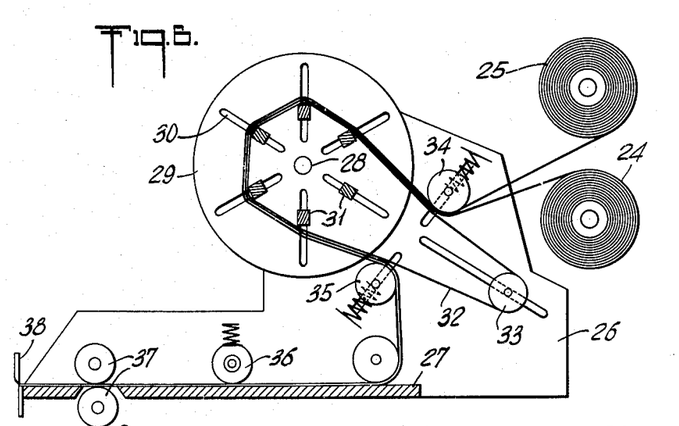
FIGURE 8 is a section along VIII—VIII of FIGURE 7.

A variation in the procedure is shown in the FIGURES 7 and 8. The principle of the arrangement intended to produce the transverse welds is the same, but the radial position of the electrodes 31 kept by guiding in the slots 30 of the plates 29 is fixed by rotation of plates 29' duplicating the plates 29 and carrying slots in an arc of a circle 30', in which are engaged the ends of shafts integral with the electrodes. When the plates 29' are made to turn with respect to the plates 29, all the electrodes 31 are simultaneously brought nearer or moved apart.

The belt support 25 is replaced by an endless belt 39 passing on guiding and tension rollers 40. The casing 24 is introduced between the bands 32 and 39 opposite the cylinder 34, between the latter and a supporting cylinder 41.

The lengthwise seams are produced by endless metal threads spaced the width of the casings to be produced on the principal casing 24, separate casings which are then divided by the transverse seams. These threads 42 are brought in contact with the casing 24 opposite the supporting cylinder 41 and the pressure cylinder 34; they have been previously heated, in an arrangement of any known type 43, to a temperature sufficient to cause the material of the casing 24 to melt, and they pass approximately through the latter owing to the tension communicated to the said endless threads by the idler pulleys 44 and the curvature of the pressure cylinder 34. The said threads 42 are incorporated in the casing, which is welded longitudinally on both sides, and they accompany it during the transverse welding operation carried out by the electrodes 31. At the exit from the machine, at the moment when the casing 24 is detached from the band 39, the threads 42 pass on to a reversing cylinder 45 which makes them go right through the casing in order to complete the lengthwise cutting out between parallel unit casings.

Figure 9:
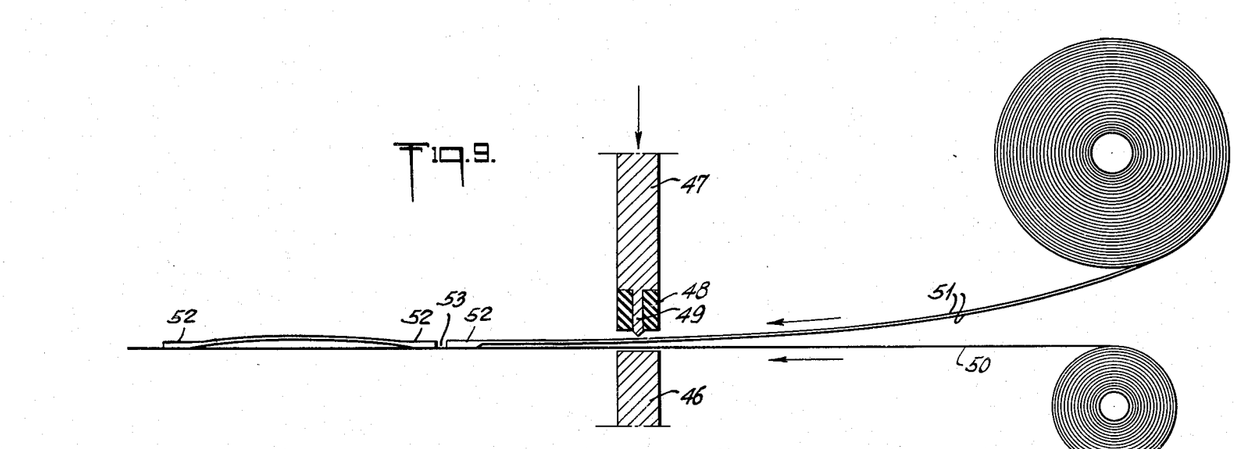
FIGURE 9 is a diagrammatic longitudinal sectional view in a preferred embodiment of welding equipment in which the cutting of the bag is simultaneously effected.
Figure 10:
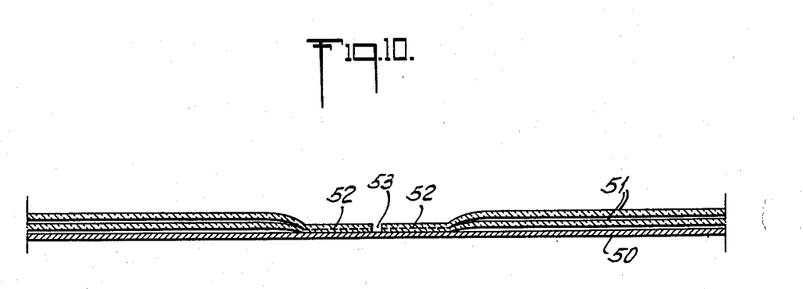
FIGURE 10 is a view on a larger scale of a detail of FIGURE 9.

The welding equipment represented on the FIGURES 9 and 10 comprises a heating electrode 46 which may be rectilinear or shaped and a counter-electrode 47 which has on its supporting face a facing 48 of silicone rubber or the like with a metal element 49 at the center of the latter and the plan outline of which corresponds to the cutting outline generally placed along the axis of the seam.

The support 50, made of paper, for example, is brought against the heating electrode 46 with the casing 51 thereon. When it has advanced a length corresponding to the width of the bag, the counter-electrode is placed in support thereof and produces a weld 52 welding the casing in depth and causing the adhesion of the latter to the paper support, which prevents a lateral contraction of the casing which would give rise to a deformation of the bag, while the element 49 drives out the fused material and causes the cut 53.

Figure 11:
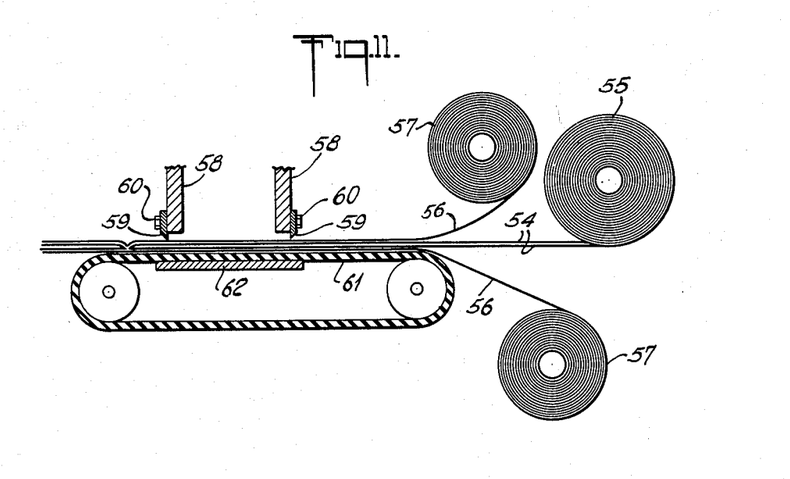
FIGURE 11 is a diagrammatic vertical section in a welding equipment for welding in shape along a plane transverse to the seam.
Figure 12:
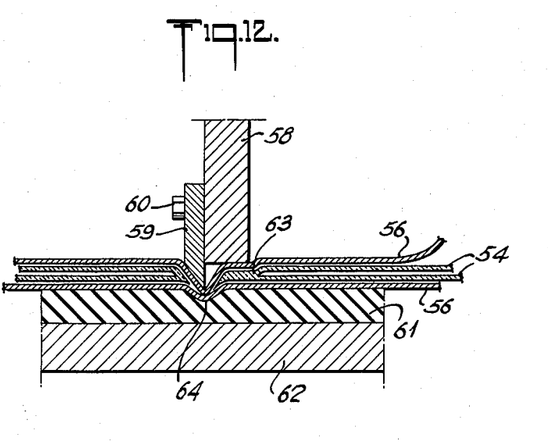
FIGURE 12 is a detailed view of FIGURE 11 on a larger scale opposite to the electrode at the moment of welding.

In the embodiment of FIGURES 11 and 12, one casing or two superposed theromplastic films 54 are unwound from a feed roller 55 or issue from an extrusion head. They are introduced between two supports consisting, for example, of sheets of paper 56 reeled off from spools 57. The pile is then introduced into the welding position. If it is a question of producing a bag welded in a shape, the welding equipment comprises a heating electrode 58 in the shape of the welded seam with, on the whole of the periphery of the latter, an element 59 forming a thin projecting ridge. The element 59 is attached to the heating electrode 58 by means of bolts 60 which permit adjusting the distance that the element 59 projects beyond the electrode 58. The heating electrode cooperates with a flexible counter-electrode comprising, for example, a carpet conveyor 61 which is thick, pliable or semi-hard, resting on a supporting plate 62 opposite to the welding apparatus. At the moment when the weld takes place (FIGURE 12), the heated thermoplastic material 54 melts opposite to the ridge of the element 59 and opposite to the heating electrode 58 but the ridge of the element 59 exerts a high pressure along its line of contact 64 which forces the two supporting layers against one another while tending to drive them into the flexible counter-electrode. The result is that the thermoplastic material melts and runs on both sides of the line 64, while towards the inside of the section, at 63, opposite the electrode 58, the two thicknesses 54 are welded together.

It is evident that, in regulating the projection of the ridge 64 of the element 59 with respect to the electrode 58, it can be done so that a thin layer of thermoplastic material exists opposite the line of contact 64, the cutting then only being started.

The lower support 56 in contact with the counter-electrode may possibly be abolished if the conveyor has a surface of such a nature that it will not adhere to the thermoplastic material at the operating temperatures and pressures. The said lower support also increases the rigidity of surface of the carpet conveyor and gives a less flat and therefore more solid seam.

When the welded seam is a rectilinear seam between two units, for example between two bags, the cutting ridge 59' (FIGURE 13) is placed between two elements of the heating electrode 58'. For the carpet conveyor 61 there may be substituted either a rectilinear counter-electrode which may be flexible or semi-rigid, or a cylinder 65 with its surface coated with a layer 61,' showing the same characteristics.

Figures 13, 14:
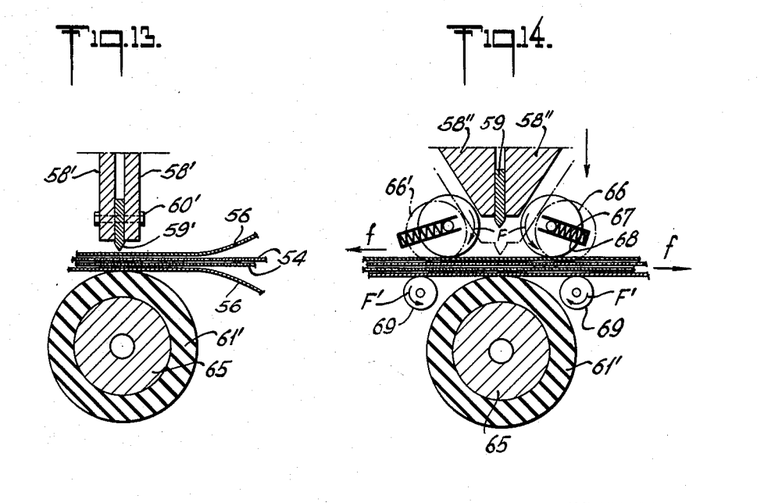
FIGURE 13 is a sectional view corresponding to FIGURE 11 in a welding equipment for rectilinear seams.
FIGURE 14 is a view corresponding to FIGURE 13 for a modified welding equipment ensuring that the welded material is kept tensioned.

When a cylinder is used as counter-electrode, it is preferable to stretch the unit comprising the support 56 and the films of thermoplastic material 54, which facilitates the welding and the cutting by tension. For this purpose an arrangement of the kind illustrated in FIG- URE 14 can be used. The lateral surafces of the two heating electrodes 58" form a wedge cam capable of cooperating flexibly with two movable cylinders 66, against the action of springs 67, in slides 68 slightly inclined towards the plane of operation. When the electrode descends, the cylinders 66 are moved out towards the position 66' and even beyond at the moment of welding, while turning in the opposite direction in the direction of the arrows F, and they cooperate with the fixed cylinders 69 in order to tighten the supports 56 and the thermoplastic material 54. The cylinders 69 are also carried along by friction in the direction of the arrows F', the sheets of material being stretched in the direction of the arrows f. The cylinders 69 may be tangential to a horizontal plane slightly above the upper coated edge 61' of the cylinder 65, which improves the separation of the materials from the surface of the latter.

Figure 15:
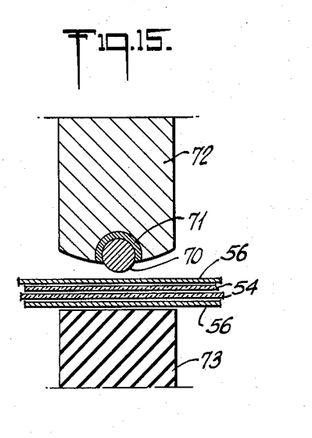
FIGURE 15 is a sectional view corresponding to FIGURE 13 in a welding electrode heated by impulses.

Finally, it is possible, as shown in FIGURE 15, to use heating electrodes composed of an electrical resistance 70 with a preferably circular section half mounted in a recess with interposition of an insulator 71 in the active face of the body 72 of the electrode. This counter-electrode cooperates with a counter-electrode 73 which is hard or semi-hard.

Figure 16:
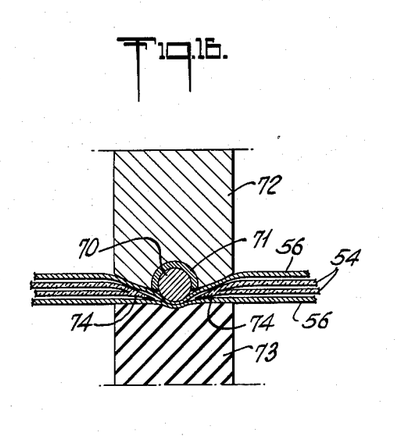
FIGURE 16 is a view corresponding to FIGURE 15 during the welding operation.

At the moment of welding (FIGURE 16) the thermoplastic material melted by the temperature developed by the resistance 70 of the heating electrode is driven out by the semicylindrical form of the pressure surface and gives rise to two welded seams 74 separated by a zone in which the two supports 56 are in contact or close together, which ensures the cutting out simultaneously or at least creates a start of the cutting of small thickness. The lower support sheet 56 is depressed by the body of the electrode 72 to form an impression along the edge seam 74 in that surface of the paper support which is in contact with the thermoplastic material.

According to another essential feature of the present patent, a start is made (FIGURE 17) from a film 75 which is folded in a V on its two edges so that its free edges come approximately in the vicinity of its median line 76. The folded film is superposed on a support 77 and passes under a cylinder 78 intermittently rotating, provided with a flexible coating analogous to the cylinder 65 of FIGURES 13 and 14, with which a welding electrode 79 cooperates.

Figure 17:
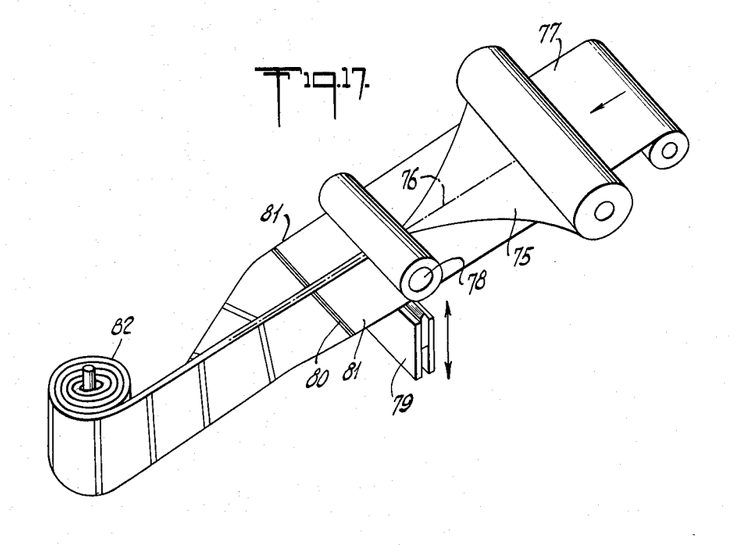
FIGURE 17 is a diagrammatic perspective view of a machine for the continuous manufacture of rolled-up bags.

The welding equipment produces, across the superposed films, seams 80 with axial cutting or start of cutting, giving rise to two bags 81 with openings opposite to one another, the successive pairs of bags remaining together by the support 77 or by their incipient cutting, as the case may be. It is then sufficient to cut along the line 76 to give rise to two series of bags which can be rolled up at 82 either on a single spool, as shown, or on two different spools. There is thus obtained a new introduction of bags rolled up with their openings on one of the edges of the roll.

The arrangements of the electrodes or welding jaws described above by way of example are capable of numerous modifications. The process has thus been described, for example, in the form of an alternating process, but it applies equally to continuous longitudinal welding with simultaneous cutting or start of cutting, the heating electrode being in this case composed of two heating discs or pressure discs with a cutter projecting between them, the peripheral section of the rotary electrode being any one of the sections described in FIGURES 12, 13 or 15. Shaped electrodes can also be coiled on the periphery of a cylinder.

The said electrodes or welding jaws are applicable to the machines described with reference to the FIGURES 1 to 4 and 6 and 7, and they allow the welding and cutting out to be realized simultaneously.

The present application is a division of my copending application Serial No. 684,440, filed September 17, 1957, now abandoned.

What I claim is:
1. Plastic bags, supported by a sheet of paper, each of said bags being characterized by thermo-welded joints that adhere to the paper which supports it.
2. Plastic bags according to claim 1, obtained from a film of thermoplastic material folded in V shape on one of its edges, each bag remaining attached to the adjacent bags along its lateral edges, the said bags being rolled up on a spool with their openings on one of the edges of the spool.
3. A theromplastic article sealed at the edges thereof to present a smooth-edge seam, said article being supported by a sheet of paper and adhering to the paper only along said edge seam.
4. A thermoplastic article, thermo-welded at the edges thereof to form a smooth-edge seam, said article being supported by and adhering to a sheet of paper along said seam.
5. An integral unit comprising a paper support and a thermoplastic article sealed at the edges thereof to form a smooth edge, said paper support being adhered to the thermoplastic article only at the edges thereof.
6. Two sheets of thermoplastic material supported by a single sheet of paper; said thermoplastic material being sealed at the edges thereof to form a desired outline, and said paper adhering to the thermoplastic material only along the outline.
7. A thermoplastic article having thermo-welded seams said article being supported upon a sheet of paper and adhering to said paper only along said thermo-welded seams.
8. An article formed from a sheet of thermoplastic material and characterized by thermo-welded edged seams; said article being supported by a single sheet of paper that adheres only to the thermo-welded seams; the force of adhesion being sufficient to prevent the article from shifting its position with respect to the surface of the paper support during normal handling and the force of adhesion being such as to permit the ready separation of the paper support from the article when the support is no longer needed without tearing the paper.
9. A thermoplastic article sealed at the edges thereof to present a smooth-edge seam, said article being supported by a sheet of paper and adhering to the paper only along said edge seam, and said supporting sheet of paper bearing an impression along said edge seam in that surface of the paper which is in contact with said thermoplastic article.

References Cited in the file of this patent

UNITED STATES PATENTS

| | | |
|---|---|---|
| 205,840 | Davenport | July 9, 1878 |
| 1,853,013 | Brady | Apr. 5, 1932 |
| 1,868,069 | Munson | July 19, 1932 |
| 2,116,571 | Gurwick | May 10, 1938 |
| 2,149,030 | Moore | Feb. 28, 1939 |
| 2,158,755 | Hodgdon et al. | May 16, 1939 |
| 2,773,285 | Piazze et al. | Dec. 11, 1956 |

FOREIGN PATENTS

| | | |
|---|---|---|
| 890,450 | Germany | Sept. 17, 1953 |